US007667955B2

(12) United States Patent
Takeda

(10) Patent No.: US 7,667,955 B2
(45) Date of Patent: Feb. 23, 2010

(54) LIQUID CRYSTAL DISPLAY

(75) Inventor: Kenichi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 418 days.

(21) Appl. No.: 11/366,219

(22) Filed: Mar. 2, 2006

(65) Prior Publication Data

US 2006/0207434 A1 Sep. 21, 2006

(30) Foreign Application Priority Data

Mar. 2, 2005 (JP) ............... 2005-001057 U

(51) Int. Cl.
*G06F 1/16* (2006.01)
(52) U.S. Cl. .............. 361/679.21; 248/278.1; 349/58
(58) Field of Classification Search .......... 361/681, 361/682
See application file for complete search history.

(56) References Cited

U.S. PATENT DOCUMENTS

| 5,752,292 | A * | 5/1998 | Rachel ............ 16/254 |
| 6,392,873 | B1 * | 5/2002 | Honda ............ 361/681 |
| 6,421,231 | B1 * | 7/2002 | Jung ............ 361/681 |
| 6,430,039 | B2 * | 8/2002 | Nakajima et al. ............ 361/681 |
| 6,484,994 | B2 * | 11/2002 | Hokugoh ............ 248/371 |
| 6,774,959 | B2 * | 8/2004 | Agata et al. ............ 349/58 |
| 6,822,857 | B2 * | 11/2004 | Jung et al. ............ 361/679.02 |
| 6,837,469 | B2 * | 1/2005 | Wu et al. ............ 248/278.1 |
| 6,905,103 | B2 * | 6/2005 | Kim ............ 248/398 |
| 7,236,215 | B2 * | 6/2007 | Okamoto et al. ............ 349/58 |
| 7,267,312 | B2 * | 9/2007 | Kang et al. ............ 248/291.1 |
| 7,287,729 | B2 * | 10/2007 | Jung et al. ............ 248/122.1 |

FOREIGN PATENT DOCUMENTS

JP 2003-15542 1/2003

OTHER PUBLICATIONS

Patent Abstracts of Japan, Publication No. 2003-015542, Publication Date: Jan. 17, 2003, 2 pages.

* cited by examiner

*Primary Examiner*—Lisa Lea-Edmonds
(74) *Attorney, Agent, or Firm*—Osha • Liang LLP

(57) ABSTRACT

In a liquid crystal display, an enclosure is formed by detachably fitting a synthetic resin-made front enclosure including a liquid crystal panel with a synthetic resin-made rear enclosure, and the enclosure is fitted upright to a stand by drilling a substantially U-shaped stand hole in the middle of a bottom plate of the rear enclosure. Further, the stand is attached to the exterior casing of the liquid crystal panel by screws, the stand in the stand hole is removably formed on the outside of the rear enclosure through the cutout portion by forming the cutout portion reaching the stand hole from the edge of the bottom plate at the bottom plate of the rear enclosure 1B, and a sealing plate for sealing the cutout portion integrally protrudes from the central portion of the edge of the bottom plate of the front enclosure.

7 Claims, 16 Drawing Sheets

LIQUID CRYSTAL DISPLAY

BACKGROUND

1. Field

The present invention relates to a liquid crystal display, which can be repaired or inspected easily; reduce manufacturing cost; and cost little for a mold.

2. Description of the Related Art

A conventional liquid crystal display is disclosed in JP-A-2003-015542. Hereinafter, an example of the technologies will be described with reference to FIGS. 10 to 14. An enclosure 1 is formed by detachably fitting a synthetic resin-made front enclosure 1A including a liquid crystal panel E with a synthetic resin-made rear enclosure 1B by screws 2; a substantially U-shaped stand hole 4 is drilled in the middle of a bottom plate 3 of the rear enclosure 1B; four bosses 6 (front and rear in each of right and left) integrally protrudes from the lower portion of a rear plate 5 of the rear enclosure 1B toward the stand hole 4; an extending plate 8 extending from the lower end of a metal board 7 attached to the rear plate 5 is inserted between the right and left bosses 6; a pair of reinforcing plates 9 (left and right) bent like, substantially, capital 'L' from both side ends of the extending plate 8 is arranged with the stand hole 4 interposed therebetween and faces bottom plates 6a of the bosses 6 individually with predetermined gaps t from the bottom plates 6a; a pair of L-shaped connecting rods 11a extending upward from both side ends of a stand 11 tiltably supported by a base 10 passes through the stand hole 4 and is inserted into the gaps t between the bosses 6 and the reinforcing plate 9; screws 12 are tightened into screw holes 9a of the reinforcing plate 9 through the bottom plates 6a of the bosses 6 and through holes 11b of the connecting rods 11a; as a result, the enclosure 1 is fitted upright to the stand 11. Meanwhile, reference numeral 13 represents a printed board attached to the rear surface of an exterior casing 14 of the liquid crystal panel E.

Hereinafter, the repairing or inspecting sequence of the liquid crystal display will be described. The stand 11 is removed from the bosses 6 and the reinforcing plate 9 by loosening the screws 12 and then lifting the enclosure 1 as shown in FIG. 15A, the screws 2 are loosened, and the rear enclosure 1B is separated from the front enclosure 1A attached with a liquid crystal panel E as shown in FIG. 15B.

After that, as shown in FIG. 16, the front enclosure 1A attached with the liquid crystal panel E, which is not yet tested, is put on stock yard S1 on a table 15, another liquid crystal panel E-attached front enclosure 1A is leaned against supporting rods 16 in test yard S2 adjacent to test yard S1, a screen of the liquid crystal panel E is observed with eyes from the front side of the front enclosure 1A, and the liquid crystal panel E and the printed board 13 are operated at the rear side of the front enclosure 1A when the liquid crystal display is repaired, fine-tuned or the like.

In the above configuration of the related art, since the front enclosure 1A attached with the liquid crystal panel E cannot stand alone, the front enclosure 1A attached with the liquid crystal panel E needs to be leaned against the supporting rods 16 or the like when the liquid crystal display is repaired or inspected at a test yard S2, which requires time and effort for repairing or inspecting. In addition, since the front enclosure 1A attached with the liquid crystal panel E is laid on a stock yard S1 when stocked, the required area should be wide, and thus the cost rises.

Furthermore, as shown in FIG. 11, since the stand hole 4 is formed at the rear enclosure 1B in the shape of, substantially, a capital letter "U", a substantially U-shaped sliding mold (not shown), which can slide in a direction c and d perpendicular to the fitting direction a and b of a male and female molds, needs to be incorporated into the male and female molds (not shown), which are used to mold the rear enclosure 1B, in order to form the stand hole 4; consequently, the mold structure becomes complicate and the cost for mold rises.

SUMMARY

The present invention provides a liquid crystal display, which can be repaired or inspected easily; reduce manufacturing cost; and cost little for a mold.

A liquid crystal display includes: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; a sealing plate that seals the cutout portion and is formed integrally with the front enclosure to be protruded from a central portion of an edge of a bottom plate of the front enclosure; a plurality of bosses that is integrally formed on the rear enclosure and protrudes from the rear plate of the rear enclosure so as to face the screws; and a screw inserting hole is formed by drilling at a bottom plate of each of the bosses, the bosses being configured to pass the screw therethrough. The stand is attached to an exterior casing of the liquid crystal panel by screws. The stand is configured to be removable through the cutout portion toward outside of the rear enclosure. The stand is attached to the exterior casing of the liquid crystal panel by the screws with a reinforcing plate being sandwiched therebetween.

A liquid crystal display includes: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; a sealing plate that seals the cutout portion and is formed integrally with the front enclosure to be protruded from a central portion of an edge of a bottom plate of the front enclosure; a plurality of bosses that is integrally formed on the rear enclosure and protrudes from the rear plate of the rear enclosure so as to face the screws; and a screw inserting hole is formed by drilling at a bottom plate of each of the bosses, the bosses being configured to pass the screw therethrough. The stand is attached to an exterior casing of the liquid crystal panel by screws. The stand is configured to be removable through the cutout portion toward outside of the rear enclosure. The stand is attached to the exterior casing of the liquid crystal panel by the screws with a reinforcing plate being sandwiched therebetween. A pair of upper and lower through holes drilled at each connecting rods is placed concentrically on screw holes formed on the reinforcing plate by making the reinforcing plate contact with front surfaces of a pair of connecting rods extending upward from both side ends of the stand and engaging engaging-pieces integrally extending backward from a lower end of the reinforcing plate with an upper edge of the stand. The reinforcing plate is coupled with the stand by tightening the screws into the screw holes on the reinforcing plate through the lower through holes of the connecting rods. The screw holes of the exterior casing is placed concentrically on the upper through holes of the connecting rods and the screw holes of the reinforcing plate by making the lower end edge portions of the exterior casing or the liquid crystal panel contact with a receiving plate bent forward from the reinforcing plate and the front surface of the reinforcing plate. The front enclosure being attached with the liquid crystal panel is coupled with the stand by tightening the screws into the screw holes of the exterior casing through the upper through holes of the connecting rods and the screw holes of the reinforcing plate.

A liquid crystal display includes: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; and a sealing plate that seals the cutout portion and is formed integrally with the front enclosure to be protruded from a central portion of an edge of a bottom plate of the front enclosure. The stand is attached to an exterior casing of the liquid crystal panel by screws. The stand is configured to be removable through the cutout portion toward outside of the rear enclosure.

DETAILED DESCRIPTION

Figure 1:
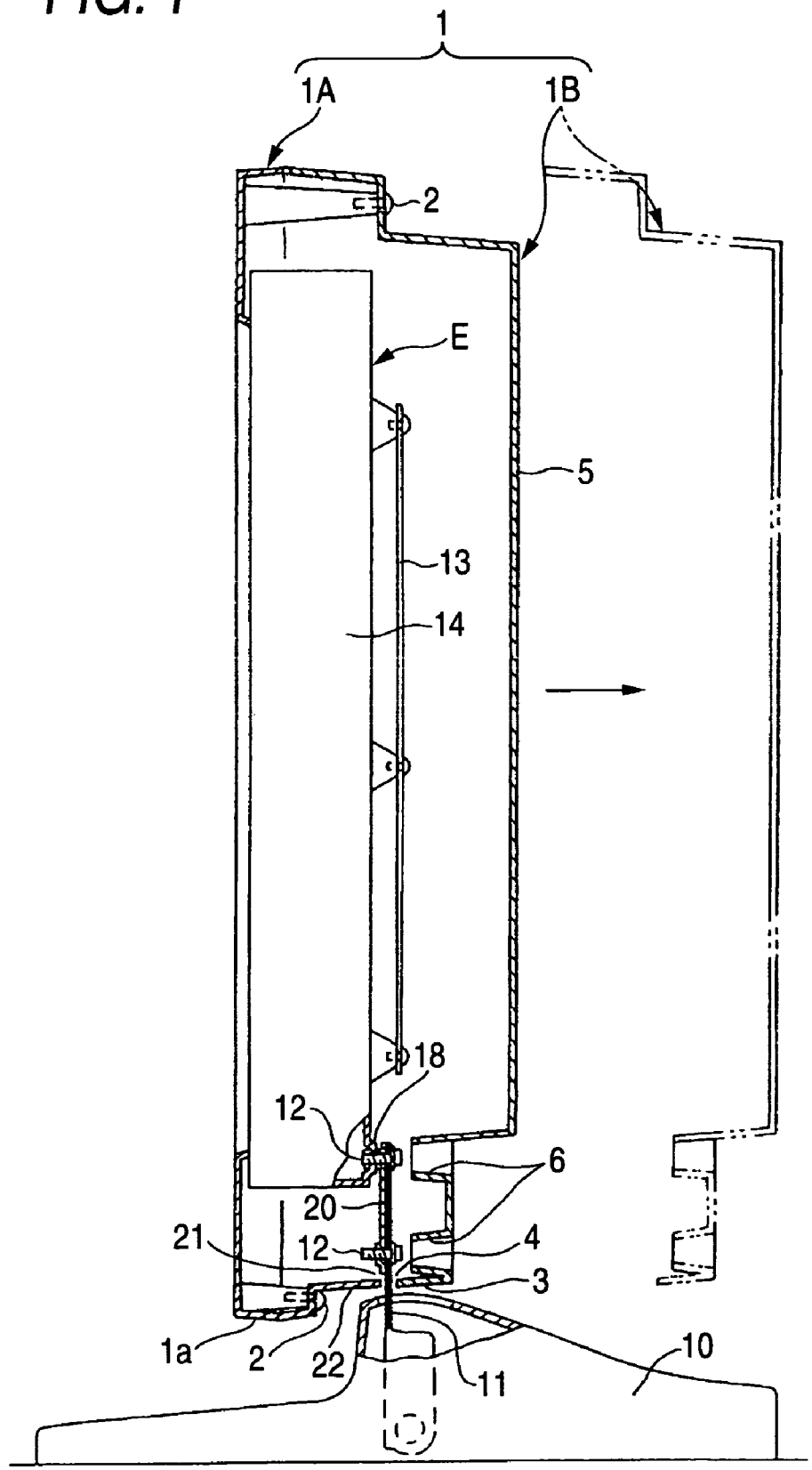
FIG. 1 is a vertical cross-sectional view showing a liquid crystal display that is a first embodiment.

FIGS. 1-5 show a liquid crystal display according to a first embodiment, in which the lower portion of the rear surface of an exterior casing 14 of a liquid crystal panel E partially extends backward by a drawing process so as to form a pair of truncated cone shaped supporters 18 (left and right); a cylindrical portions 18a is formed at the central portion of the rear end surface of each supporter 18 by a burring process; a screw hole 19 is formed on the inner circumferential surface of each cylindrical portion 18a; a rectangular plate-like metal reinforcing plate 20 is arranged at the front surfaces of both connecting rods 11a of the stand 11. Therefore, the liquid crystal panel E is fitted to the stand 11 through the reinforcing plate 20 by tightening four screws 12 into screw holes 20a of the reinforcing plate 20 through a pair of through holes 11b (upper and lower) of the connecting rods 11a and tightening two upper screws 12 into the screw holes 19 of the supporters 18.

Figure 5:
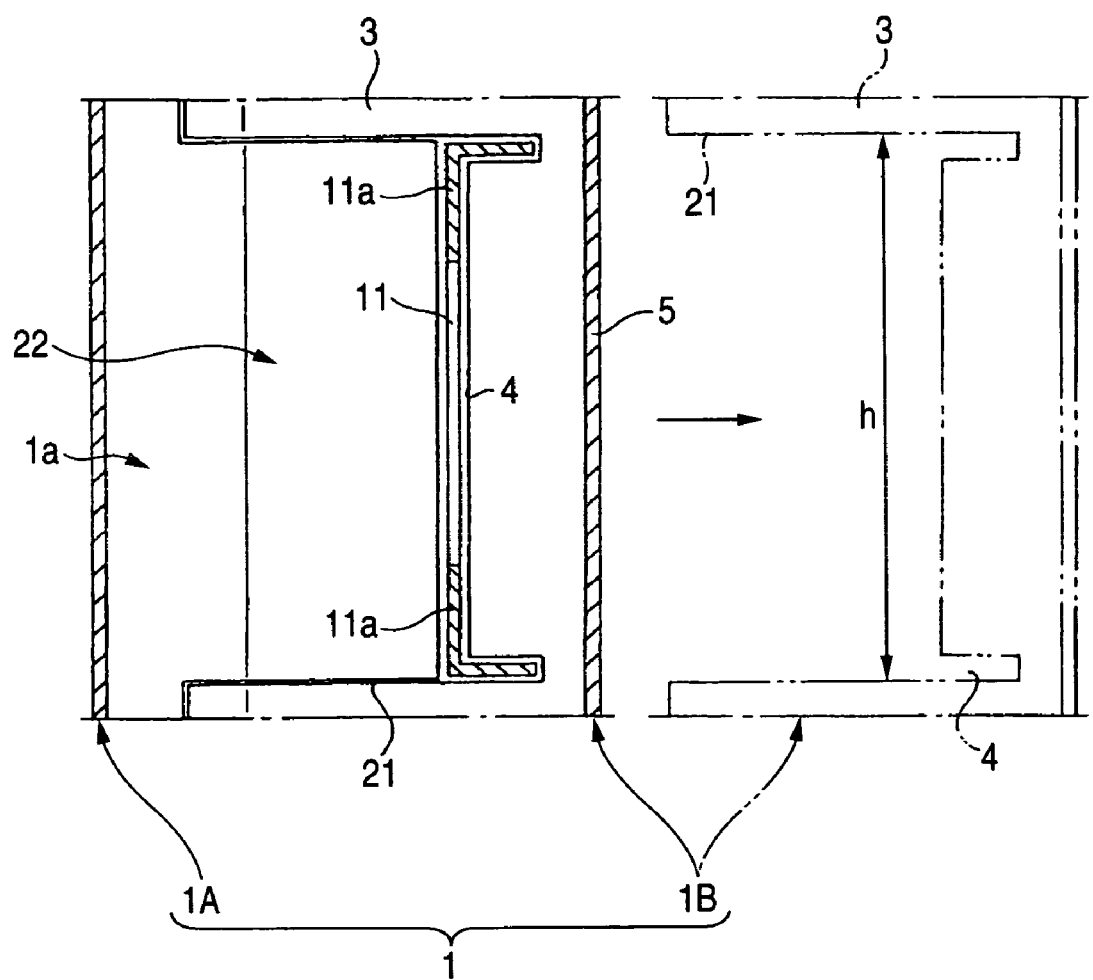
FIG. 5 is an enlarged cross-sectional view of the substantial parts as seen in a direction indicated by a V-V line in FIG. 3.

As shown in FIG. 5, a cutout portion 21 having the same width h as a stand hole 4 and reaching the stand hole 4 from the end of a bottom plate 3 of the rear enclosure 1B is formed at the bottom plate 3 of the rear enclosure 1B, the stand 11 in the stand hole 4 is removably formed on the outside of the rear enclosure 1B through the cutout portion 21, and a sealing plate 22 for sealing the cutout portion 21 integrally protrudes from the central portion of the end of the bottom plate 1a of the front enclosure 1A. Since the same reference numerals as those for the components of the construction shown in FIGS. 10-16 are attached to the other components, the description thereof will be omitted.

Hereinafter, the repairing or inspecting sequence will be described. As shown by imaginary lines in FIG. 1, the rear enclosure 1B is separated from the front enclosure 1A attached with the liquid crystal panel E after screws 2 are loosened.

Figure 6:
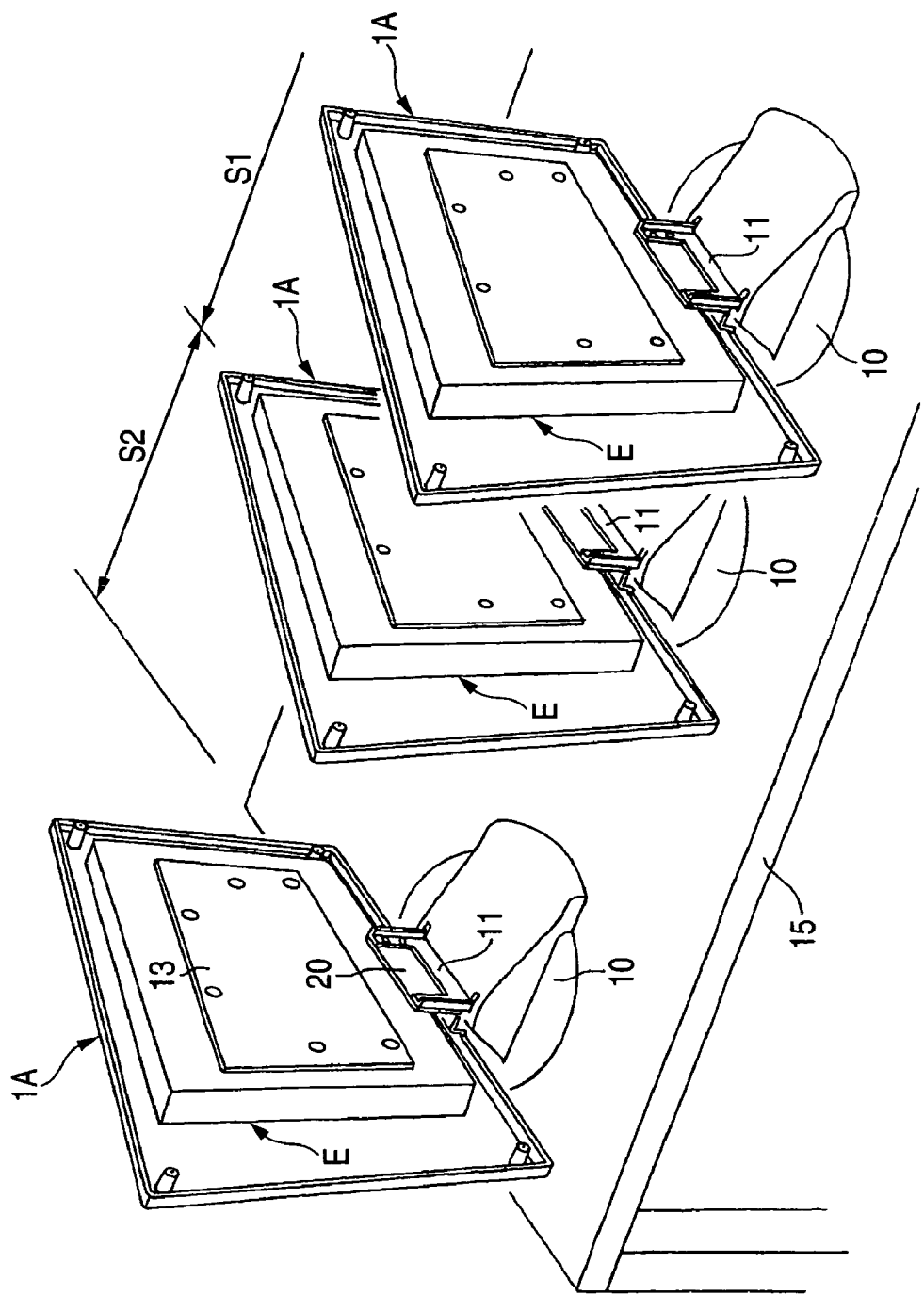
FIG. 6 is a perspective view illustrating a repairing or inspecting state.

After that, as shown in FIG. 6, the front enclosure 1A attached with the liquid crystal panel E, which is not yet tested, is made to stand alone in stock yard S1 on a table 15 by base 10 and stand 11, and the front enclosure 1A attached with the liquid crystal panel E, which is being repaired, is also made to stand alone in stock yard S2 adjacent to stock yard S1. In that state, a screen of the liquid crystal panel E is observed with eyes from the front side of the front enclosure 1A, and the liquid crystal panel E and the printed board 13 are operated at the rear side of the front enclosure 1A when the liquid crystal display is repaired, fine-tuned or the like.

According to the above construction, different from the related art, the front enclosure 1A attached with the liquid crystal panel E can be made to stand alone by the stand 11, and the front enclosure 1A attached with the liquid crystal panel E does not need to be leaned against supporting rods 16 (see FIG. 16) or the like. Therefore, the liquid crystal display can be repaired or inspected easily and swiftly. In addition, since the front enclosure 1A attached with the liquid crystal panel E can stand alone at the stock yard S1 when stocked, the required area becomes narrower than that of the related art, whereby the cost can be reduced.

Figure 2:
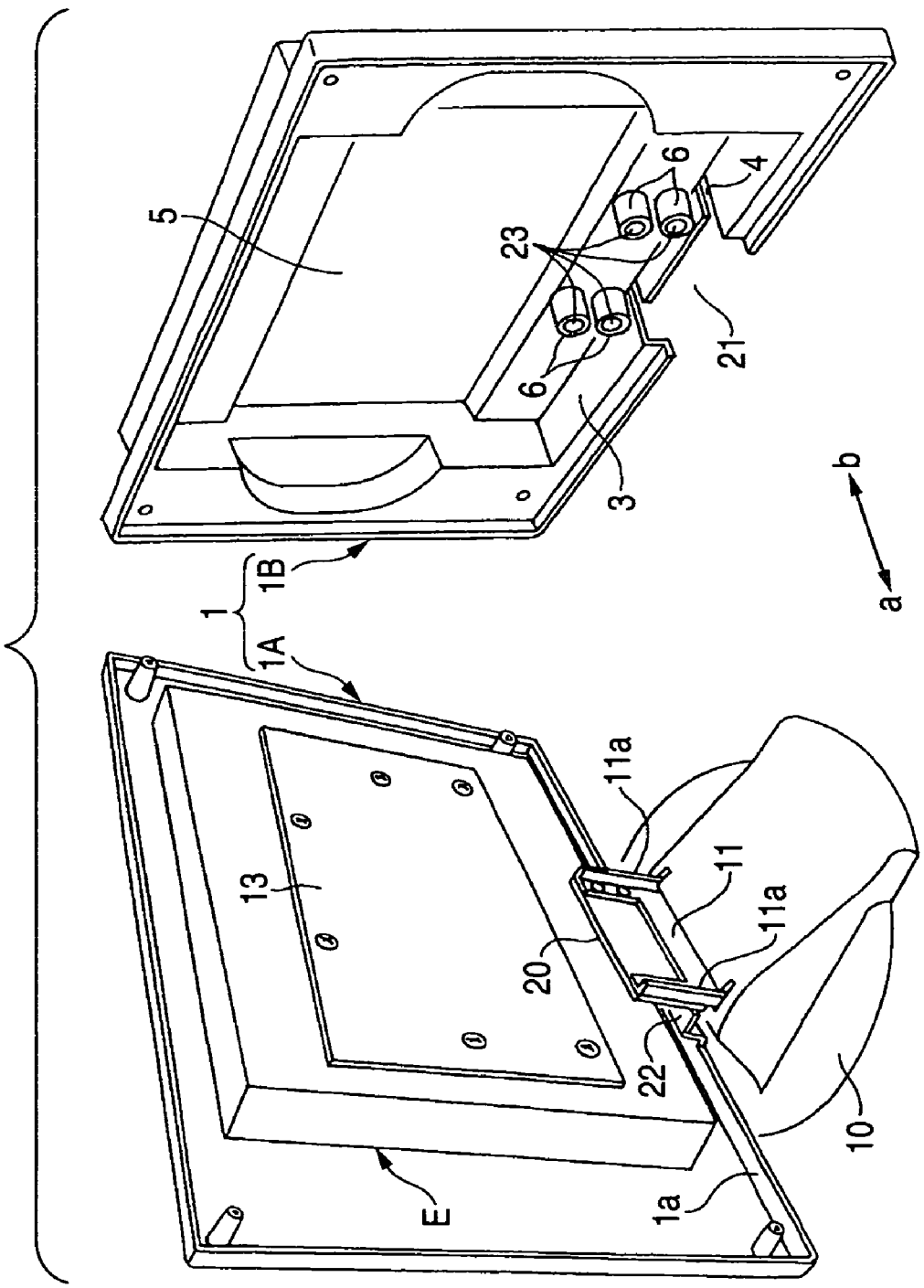
FIG. 2 is a perspective view of the separated liquid crystal display.

Furthermore, as shown in FIG. 2, the cutout portion 21 reaching the stand hole 4 from the end of the bottom plate 3 of the rear enclosure 1B is formed at the bottom plate 3 of the rear enclosure 1B, and the cutout portion 21 and the stand hole 4 can be molded only by engaging the male and female molds that are used to mold the rear enclosure 1B in an arrow direction a and b. Different from the related art, it is not required to incorporate a sliding mold engaged with the male and female molds in a direction perpendicular to the arrow direction a and b. Therefore, the mold structure becomes simpler, and thus the cost for mold can be reduced.

Still furthermore, since the coupling structure between the exterior casing 14 of the liquid crystal panel E and the stand 11 is reinforced by the reinforcing plate 20, the liquid crystal panel E-attached front enclosure can be made to stand alone more stably.

Figure 3:
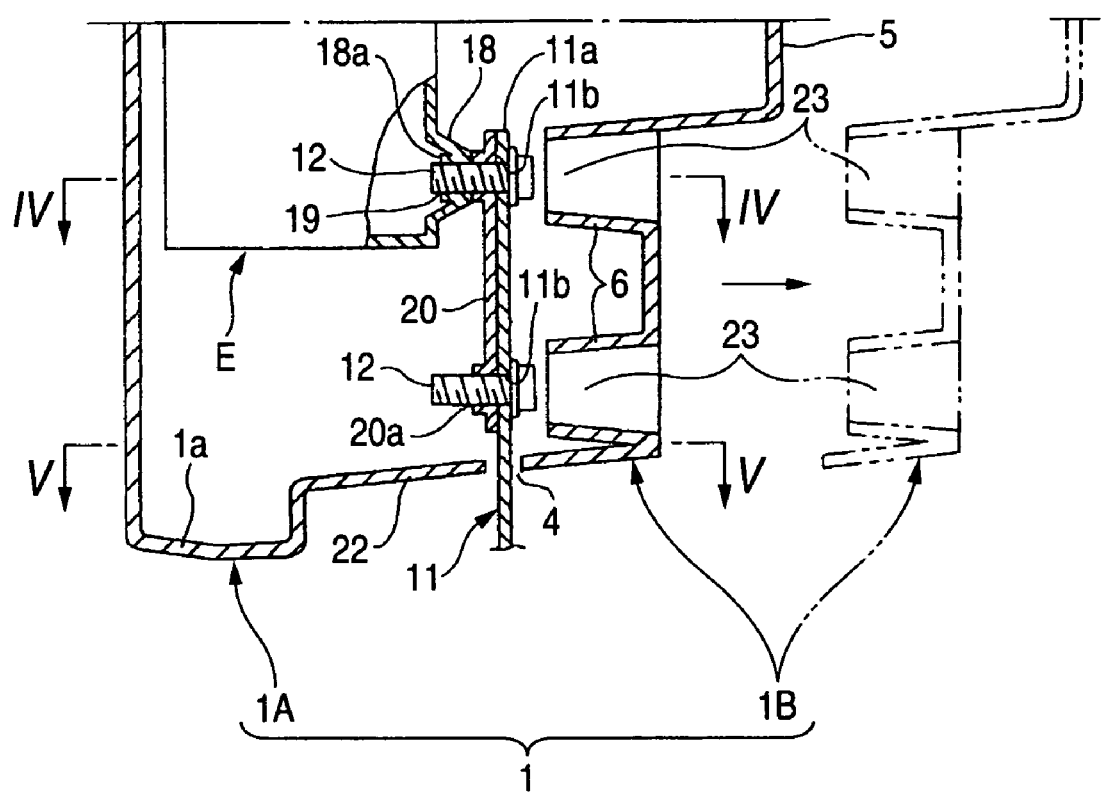
FIG. 3 is an enlarged vertical cross-sectional view of substantial parts.
Figure 4:
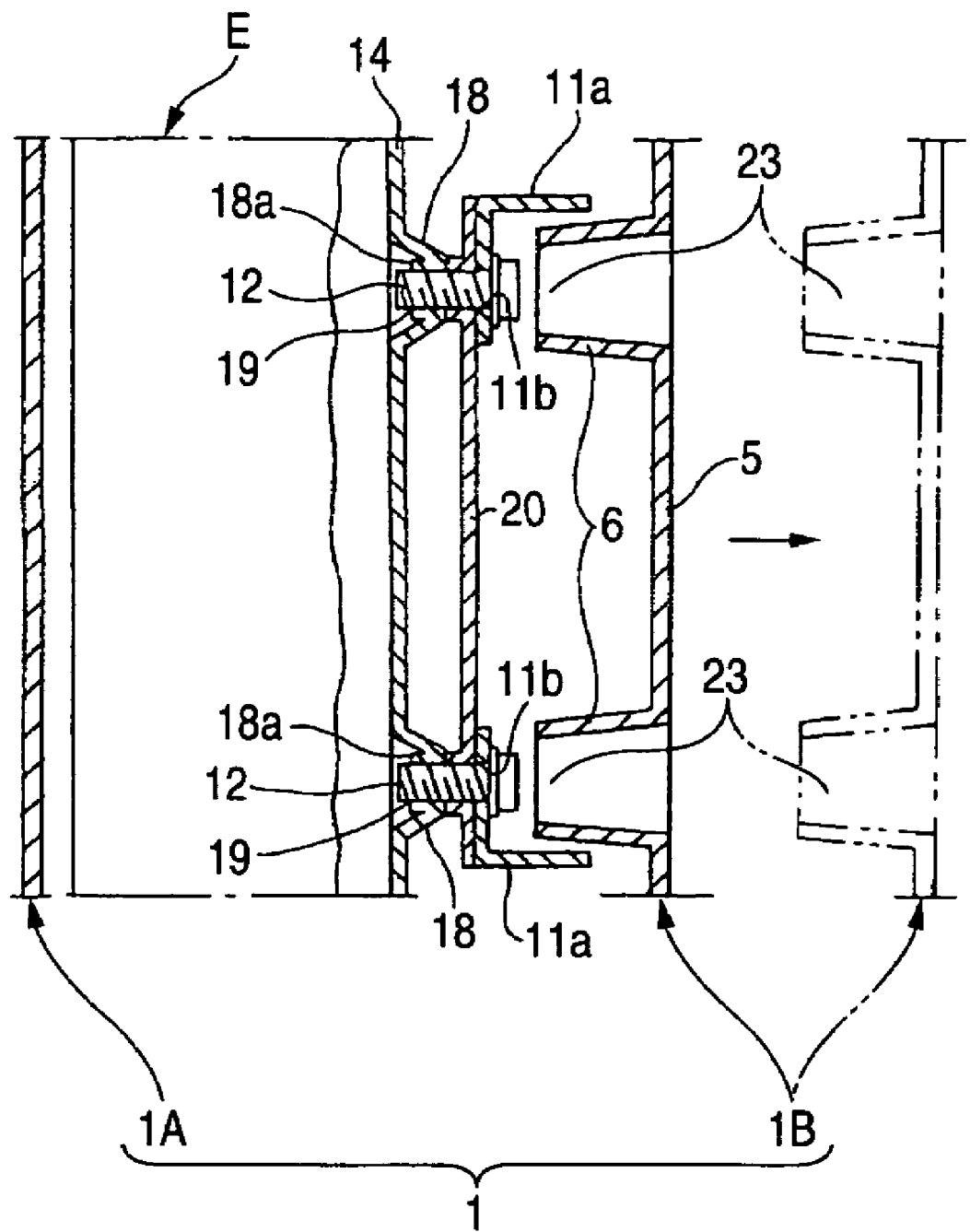
FIG. 4 is an enlarged cross-sectional view of substantial parts as seen in a direction indicated by a VI-VI line in FIG. 3.

As shown in FIGS. 3 and 4, a plurality (four in the present embodiment) of bosses 6 integrally protrudes from the rear plate 5 of the real enclosure 1B so as to face the screws 12; a screw inserting hole 23, through which the screw 12 passes, is drilled at the bottom plate 6a of each boss 6; and the screws 12 are tightened or loosened through the screw inserting holes 23 of the bosses 6 without separating the rear enclosure 1B from the front enclosure 1A. Accordingly, the stand 11 and the liquid crystal panel E can be coupled or uncoupled easily and swiftly.

In the above embodiment, even though the reinforcing plate 20 is interposed between the exterior casing 14 of the liquid crystal panel E and the stand 11, it is not necessary to provide the reinforcing plate 20 or the screw through hole 23—including bosses 6 integrally drilled in the rear enclosure 1B.

Figure 7:
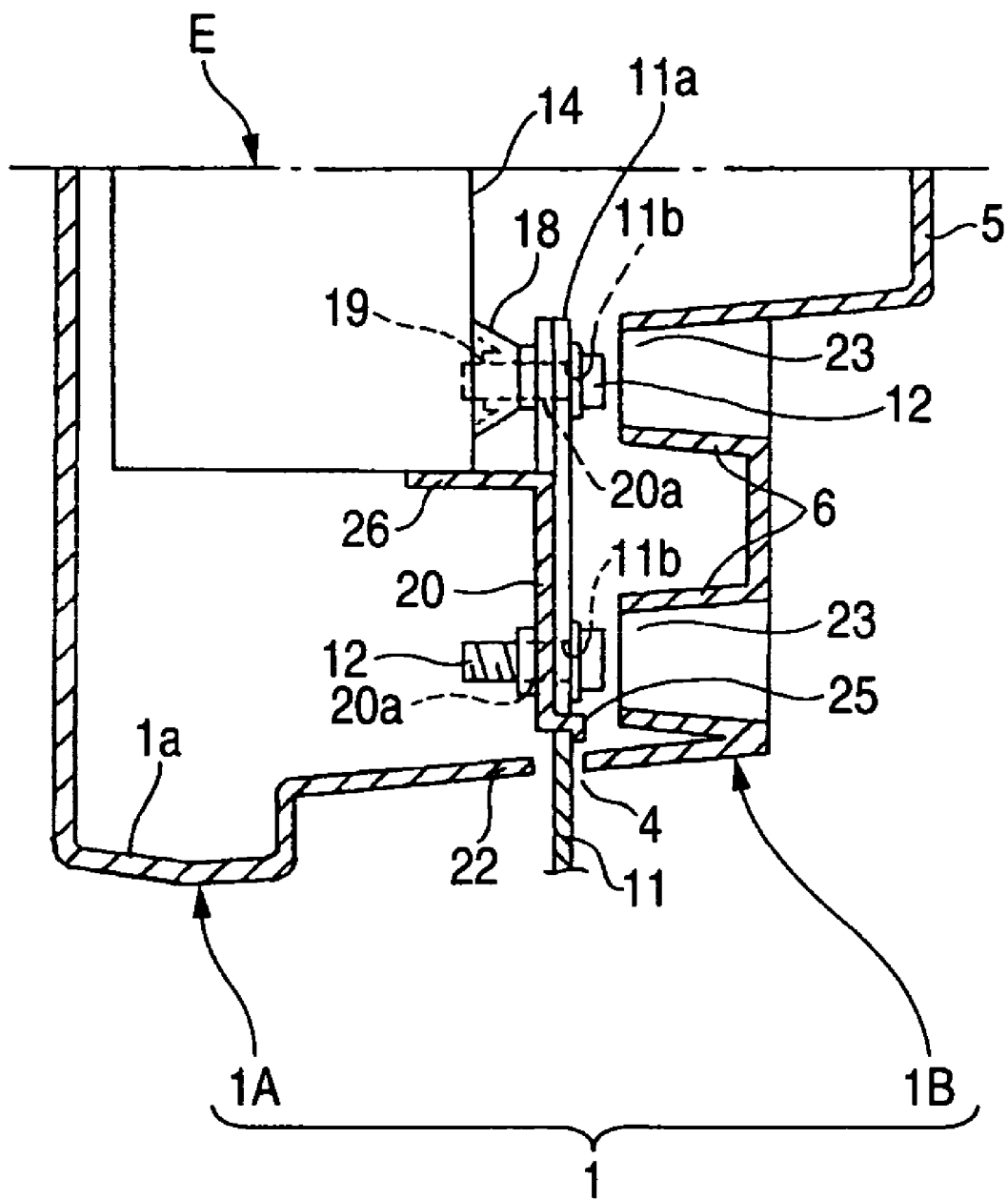
FIG. 7 is an enlarged vertical cross-sectional view of substantial parts showing a liquid crystal display according to a second embodiment.
Figure 8:
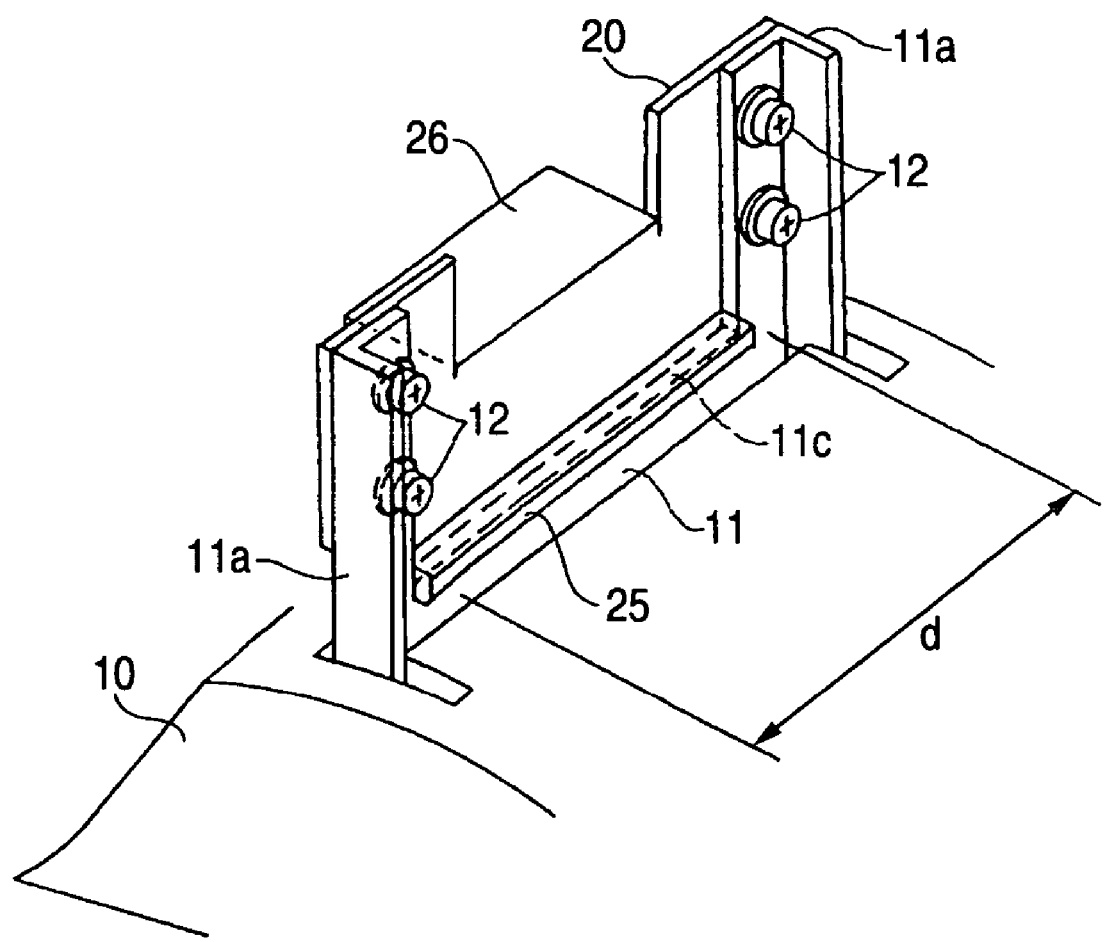
FIG. 8 is a perspective view of the substantial parts.
Figure 9:
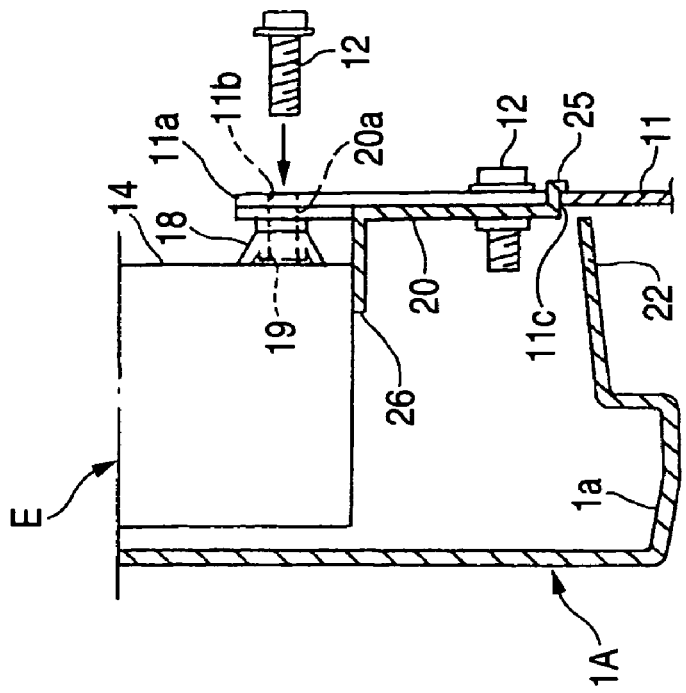
FIGS. 9A-9C are explanatory views showing a coupling sequence of the liquid crystal panel.
Figure 10:
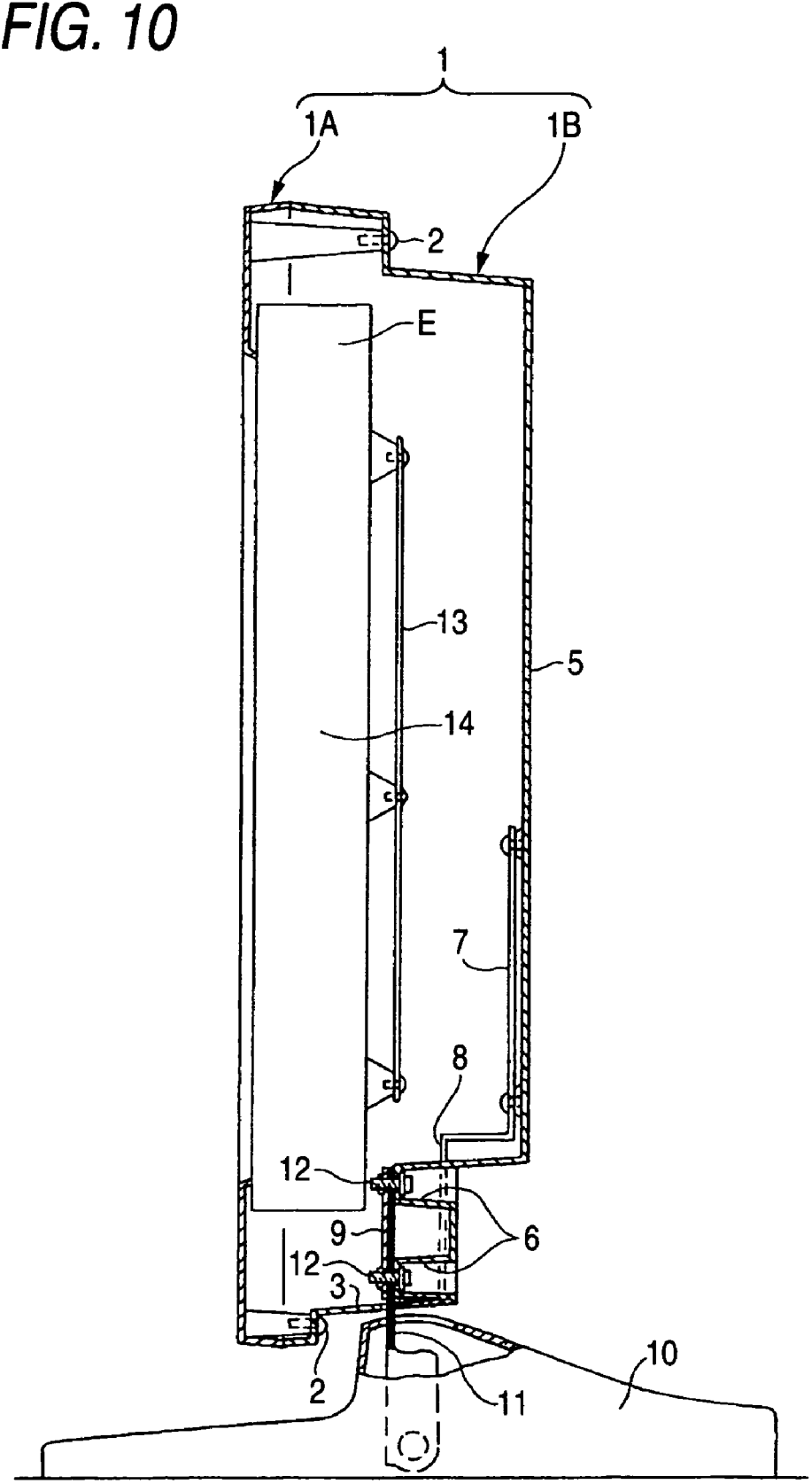
FIG. 10 is a vertical cross-sectional view showing the related art.
Figure 11:
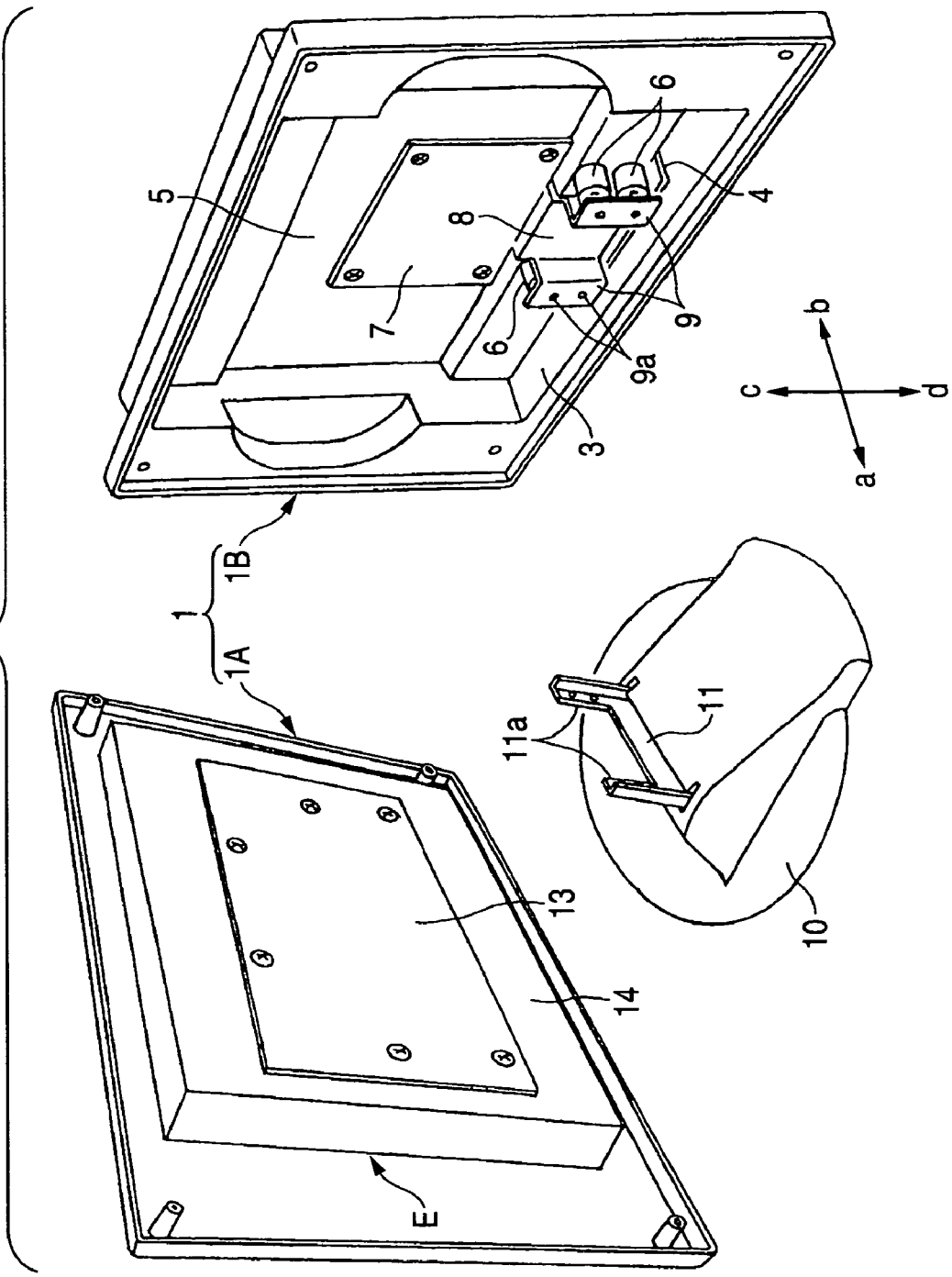
FIG. 11 is an exploded perspective view of the related art.
Figure 12:
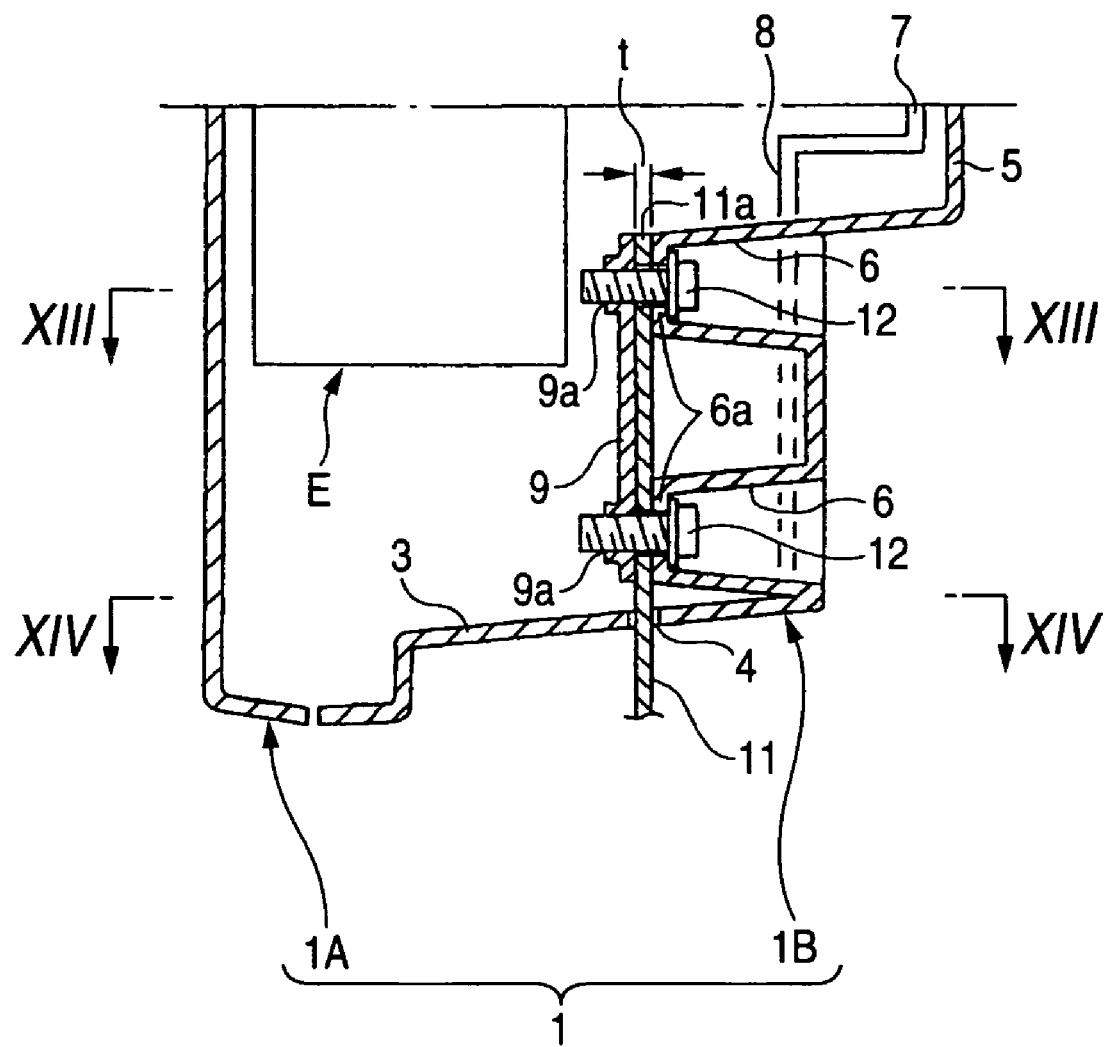
FIG. 12 is an enlarged vertical cross-sectional view of substantial parts of the related art.
Figure 13:
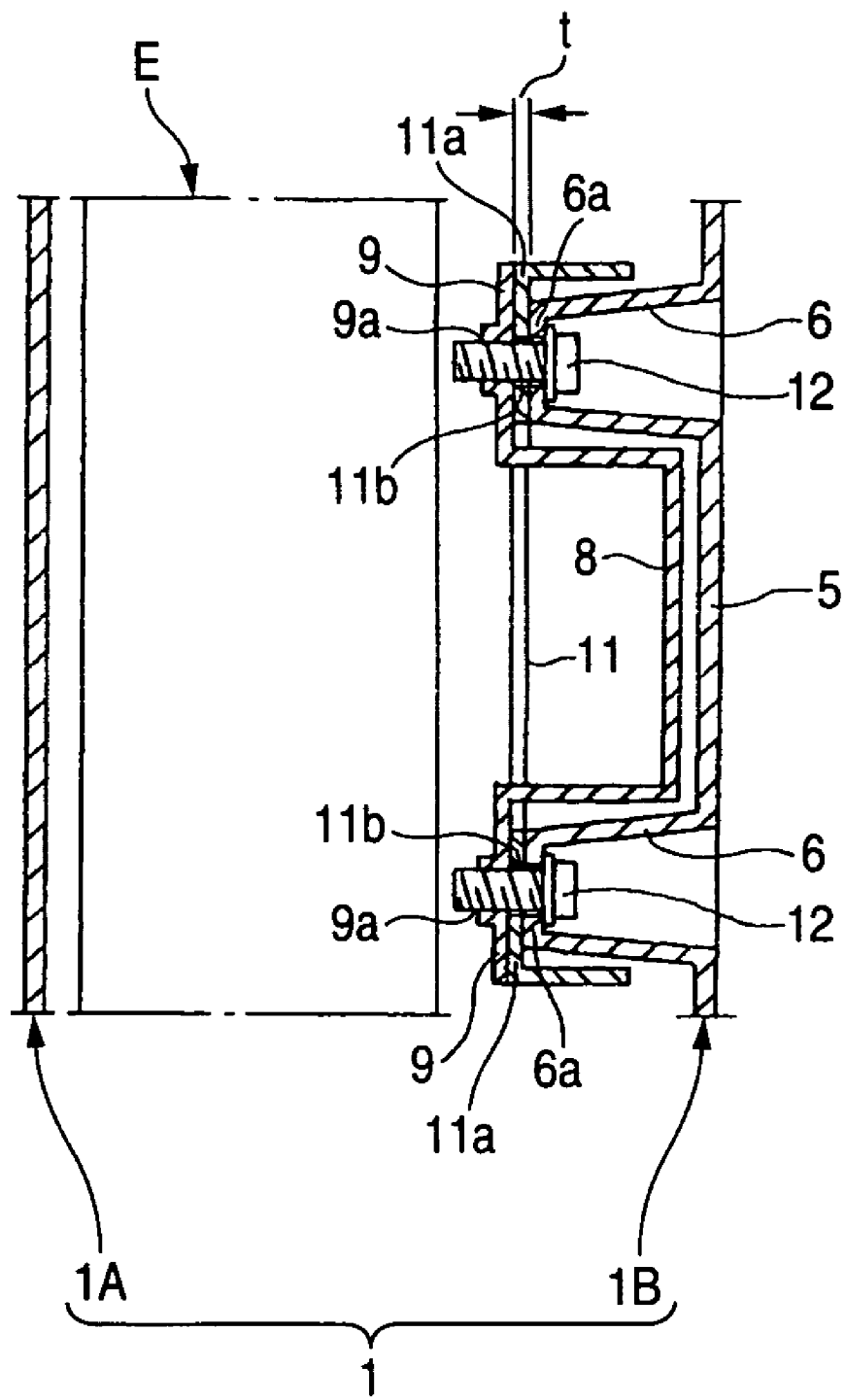
FIG. 13 is an enlarged cross-sectional view of the substantial parts as seen in a direction indicated by a XIII-XIII line in FIG. 12.
Figure 14:
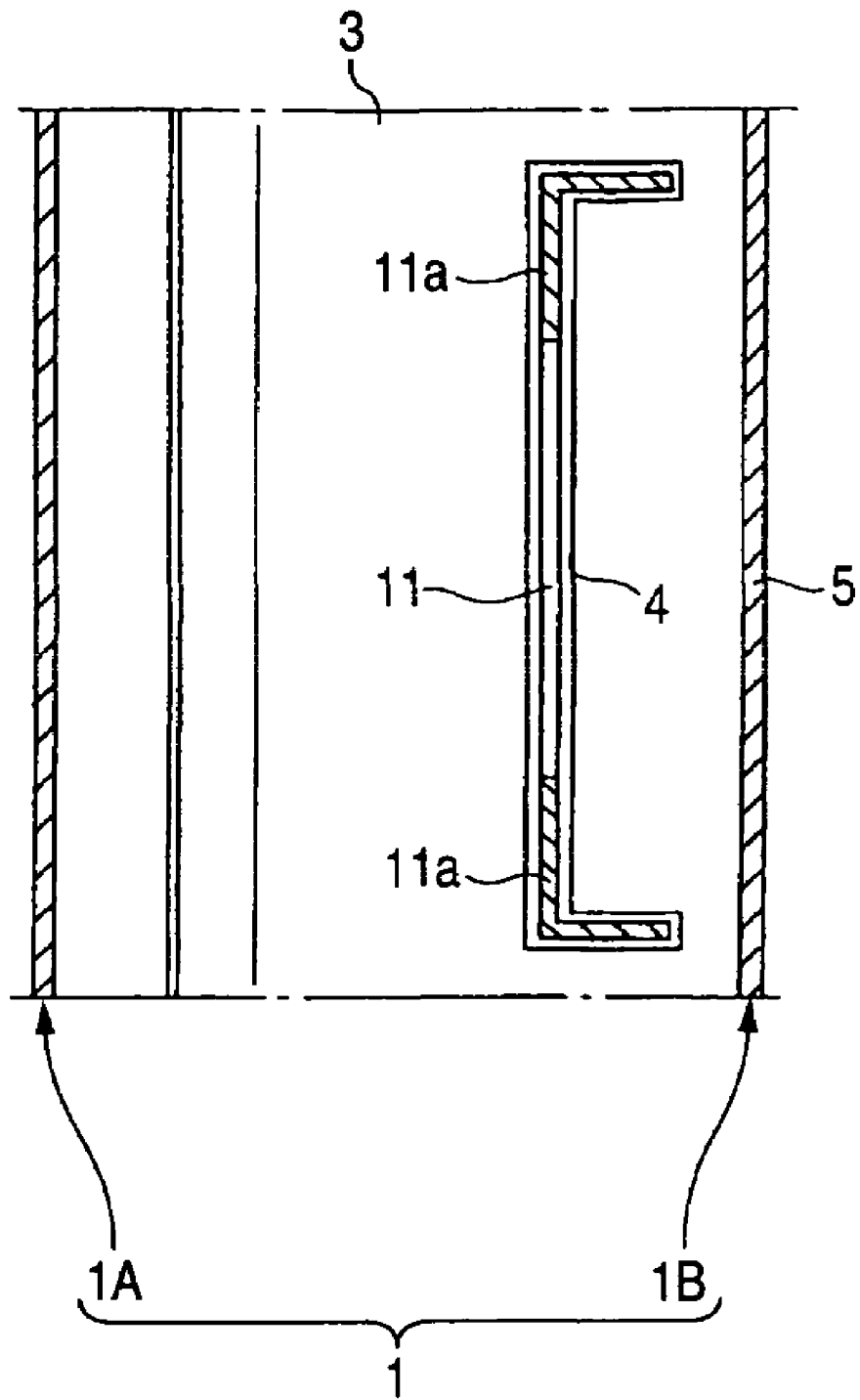
FIG. 14 is an enlarged cross-sectional view of the substantial parts as seen in a direction indicated by a XIV-XIV line in FIG. 12.
Figure 15A:
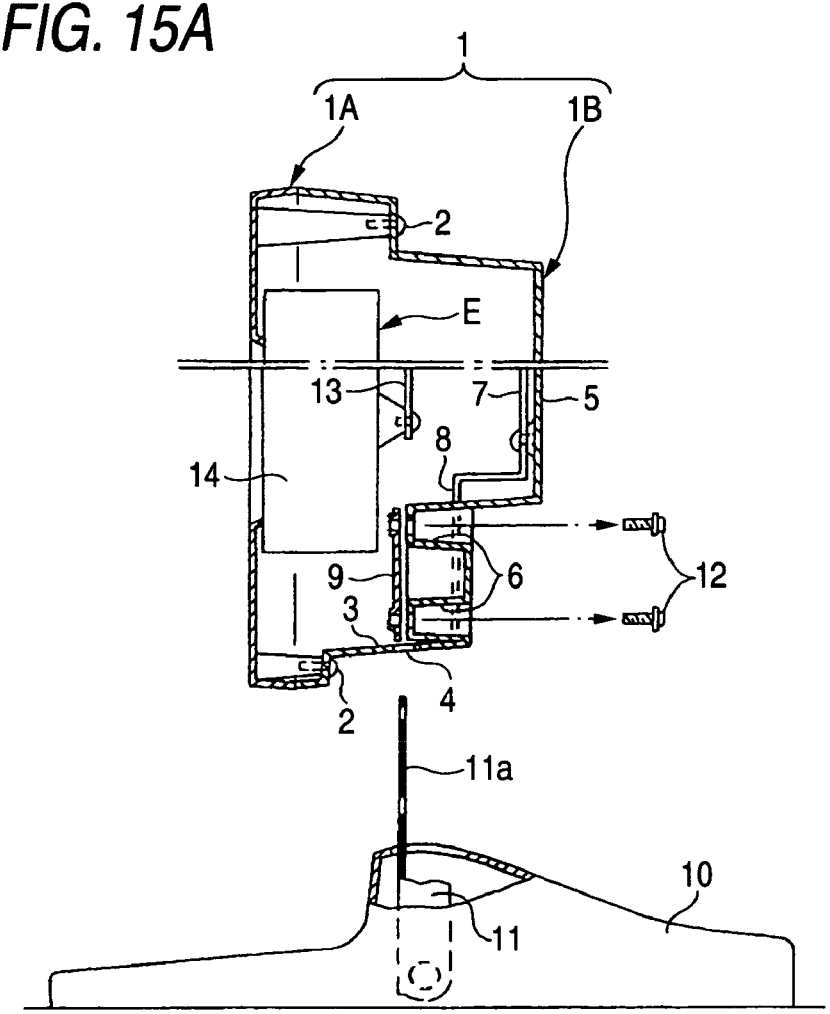
FIGS. 15A and 15B are vertical cross-sectional views showing a decoupling sequence.
Figure 15B:
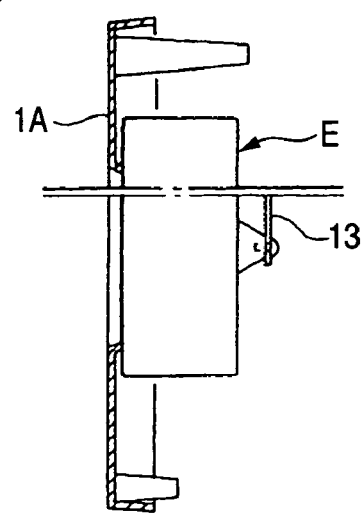
Figure 16:
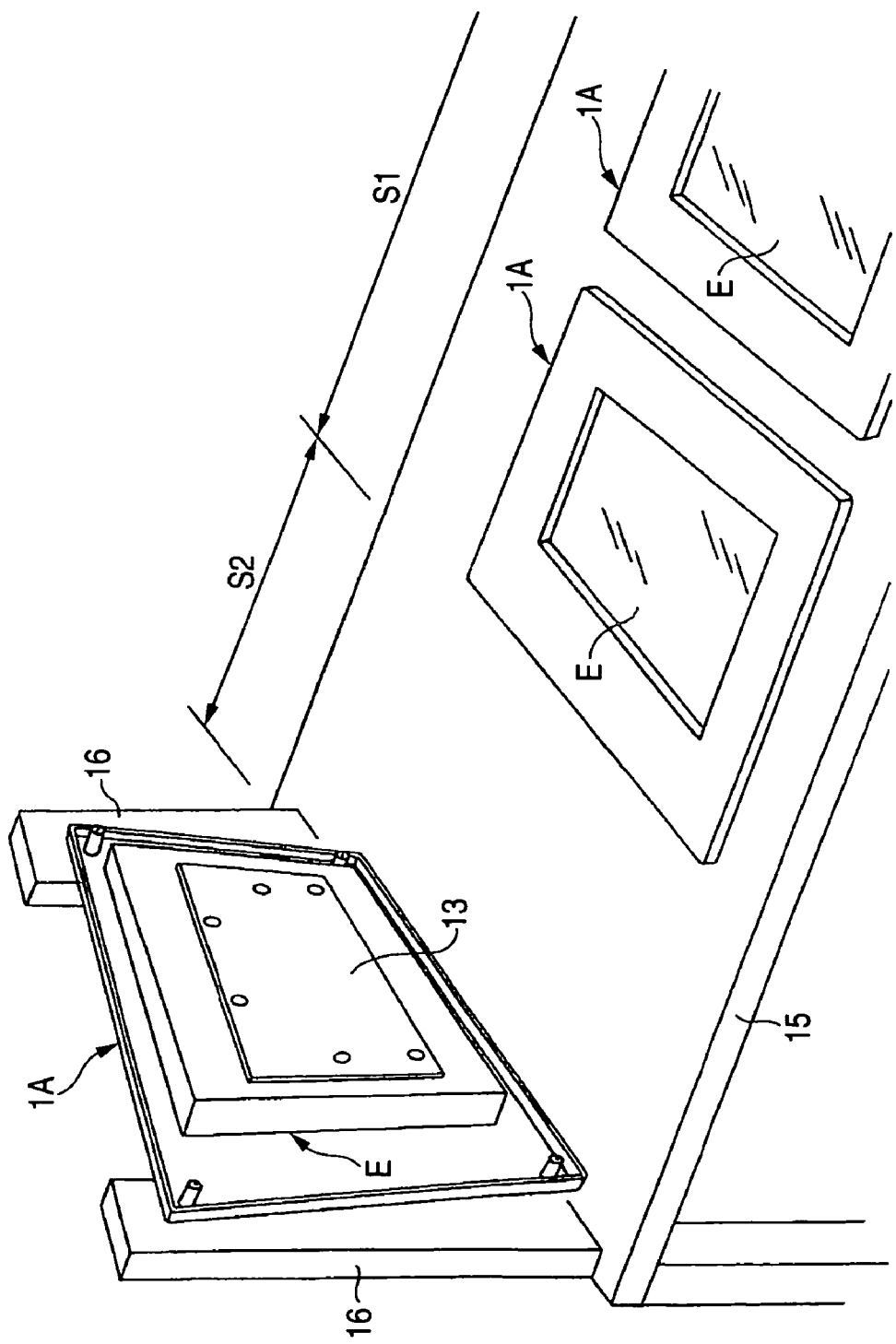
FIG. 16 is a perspective view explaining about a repairing or inspecting state.

FIGS. 7-9 show a liquid crystal display according to a second embodiment, in which substantially L-shaped engaging pieces 25 extend backward from the lower end of the reinforcing plate 20; the width d of the engaging piece 25 is set equal to or slightly smaller than the gap between both connecting rods 11a; a pair of slits is formed at the upper portion of the reinforcing plate 20; and a receiving plate 26 is bent forward at right angle between both slits. Since the other components are almost the same as those of the first embodiment, the same reference numerals are attached and the description thereof will be omitted.

Hereinafter, the coupling sequence of the liquid crystal panel E will be described. As shown in FIG. 9A, the reinforcing plate 20 comes into contact with the front surface of the connecting rods 11a, the engaging pieces 25 of the reinforcing plate 20 are engaged with the upper end 11c of the stand 11, the screw holes 20a of the reinforcing plate 20 are placed concentrically on the pair of through holes 11b (upper and lower) of the connecting rods 11a. As shown in FIG. 9B, the screws 12 are tightened into the screw holes 20a of the reinforcing plate 20 through the through holes 11b at the lower portion of the connecting rods 11a. As shown in FIG. 9C, the lower end edge portions of the exterior casing 14 of the liquid crystal panel E comes into contact with the receiving plate 26 and front surface of the reinforcing plate 20, and the screw holes 19 of the exterior casing 14 are placed concentrically on the upper through holes 11b of the connecting rods 11a and the screw holes 20a of the reinforcing plate 20. Further, the screws 12 are tightened into the screw holes 19 of the exterior casing 14 through the upper through holes 11b of the connecting rods 11a and the screws holes 20a of the reinforcing plate 20, and the liquid crystal panel E-attached front enclosure is coupled with the stand 11.

According to the above configuration, almost the same effects as those of the first embodiment (see FIGS. 1-6) can be obtained, and particularly, the screw holes 20a of the reinforcing plate 20 can be placed concentrically on the pair of through holes 11b (upper and lower) drilled on the connecting rods 11a of the stand 11 only by engaging the engaging pieces 25 of the reinforcing plate 20 with the upper end 11C of the stand 11. Furthermore, the reinforcing plate 20 can be coupled with the stand 11 simply only by tightening the screws 12 into the screw holes 20a of the reinforcing plate 20 through the lower through holes 11b of the connecting rods 11a. In addition, the screw holes 19 of the exterior casing 14 can be placed concentrically on the upper through holes 11b of the connecting rods 11a and the screw holes 20a of the reinforcing plate 20 only by making the lower end edge portions of the exterior casing 14 of the liquid crystal panel E contact with the receiving plate 26 and the front surface of the reinforcing plate 20, and the front enclosure 1A attached with the liquid crystal panel E can be coupled with the stand 11 simply and securely only by tightening the screws 12 into the screw holes 20a of the exterior casing 14 through the upper through holes 11b of the connecting rods 11a and the screw holes 20a of the reinforcing plate 20.

As described in detail with reference to the embodiment, according to the present invention, there is provided following configurations.

(1) A liquid crystal display including: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; a sealing plate that seals the cutout portion and is formed integrally with the front enclosure to be protruded from a central portion of an edge of a bottom plate of the front enclosure; a plurality of bosses that is integrally formed on the rear enclosure and protrudes from the rear plate of the rear enclosure so as to face the screws; and a screw inserting hole is formed by drilling at a bottom plate of each of the bosses, the bosses being configured to pass the screw therethrough, wherein the stand is attached to an exterior casing of the liquid crystal panel by screws, wherein the stand is configured to be removable through the cutout portion toward outside of the rear enclosure, and wherein the stand is attached to the exterior casing of the liquid crystal panel by the screws with a reinforcing plate being sandwiched therebetween.

(2) A liquid crystal display including: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; a sealing plate that seals the cutout portion and is formed integrally with the front enclosure to be protruded from a central portion of an edge of a bottom plate of the front enclosure; a plurality of bosses that is integrally formed on the rear enclosure and protrudes from the rear plate of the rear enclosure so as to face the screws; and a screw inserting hole is formed by drilling at a bottom plate of each of the bosses, the bosses being configured to pass the screw therethrough, wherein the stand is attached to an exterior casing of the liquid crystal panel by screws, wherein the stand is configured to be removable through the cutout portion toward outside of the rear enclosure, and wherein the stand is attached to the exterior casing of the liquid crystal panel by the screws with a reinforcing plate being sandwiched therebetween, wherein a pair of upper and lower through holes drilled at each connecting rods is placed concentrically on screw holes formed on the reinforcing plate by making the reinforcing plate contact with front surfaces of a pair of connecting rods extending upward from both side ends of the stand and engaging engaging-pieces integrally extending backward from a lower end of the reinforcing plate with an upper edge of the stand, wherein the reinforcing plate is coupled with the stand by tightening the screws into the screw holes on the reinforcing plate through the lower through holes of the connecting rods, wherein the screw holes of the exterior casing is placed concentrically on the upper through holes of the connecting rods and the screw holes of the reinforcing plate by making the lower end edge portions of the exterior casing or the liquid crystal panel contact with a receiving plate bent forward from the reinforcing plate and the front surface of the reinforcing plate, and wherein the front enclosure being attached with the liquid crystal panel is coupled with the stand by tightening the screws into the screw holes of the exterior casing through the upper through holes of the connecting rods and the screw holes of the reinforcing plate.

(3) A liquid crystal display including: an enclosure that is formed by detachably fitting a synthetic resin-made front enclosure including a liquid crystal panel with a synthetic resin-made rear enclosure; a stand hole that is formed by drilling in a substantially U-letter shape in a middle of a bottom plate of the rear enclosure; a stand that is attached to the rear enclosure by fitted into the stand hole, the stand supporting the enclosure upright; a cutout portion that reaches the stand hole from an edge of the bottom plate at the bottom plate of the rear enclosure; and a sealing plate that seals the cutout portion and is formed integrally with the front enclosure to be protruded from a central portion of an edge of a bottom plate of the front enclosure, wherein the stand is attached to an exterior casing of the liquid crystal panel by screws, and wherein the stand is configured to be removable through the cutout portion toward outside of the rear enclosure.

(4) The liquid crystal display according to (3), wherein the stand is attached to the exterior casing of the liquid crystal panel by the screws with a reinforcing plate being sandwiched therebetween.

(5) The liquid crystal display according to (3), further including: a plurality of bosses that is integrally formed on the rear enclosure and protrudes from the rear plate of the rear enclosure so as to face the screws; and a screw inserting hole is formed by drilling at a bottom plate of each of the bosses, the bosses being configured to pass the screw therethrough.

(6) The liquid crystal display according to (3), wherein a pair of upper and lower through holes drilled at each connecting rods is placed concentrically on screw holes formed on the reinforcing plate by making the reinforcing plate contact with front surfaces of a pair of connecting rods extending upward from both side ends of the stand and engaging engaging-pieces integrally extending backward from a lower end of the reinforcing plate with an upper edge of the stand, and wherein the reinforcing plate is coupled with the stand by tightening the screws into the screw holes on the reinforcing plate through the lower through holes of the connecting rods.

(7) The liquid crystal display according to (6), wherein the screw holes of the exterior casing is placed concentrically on the upper through holes of the connecting rods and the screw holes of the reinforcing plate by making the lower end edge portions of the exterior casing or the liquid crystal panel contact with a receiving plate bent forward from the reinforcing plate and the front surface of the reinforcing plate, and wherein the front enclosure being attached with the liquid crystal panel is coupled with the stand by tightening the screws into the screw holes of the exterior casing through the upper through holes of the connecting rods and the screw holes of the reinforcing plate.

The configuration of (1) corresponds to the first embodiment (see FIGS. 1-6). According to the configuration of (1), since the liquid crystal panel-attached front enclosure stands alone by the stand and the liquid crystal panel-attached front enclosure, different from the related art, does not need to be leaned against the supporting ballets or the like when repaired or inspected, the liquid crystal display can be repaired or inspected swiftly and easily. In addition, since the liquid crystal panel-attached front enclosure stands alone at the stock yard when stocked, the required area becomes narrower than that of the related art, and thus the cost can be reduced.

Furthermore, since the cutout portion reaching the stand hole from the edge of the bottom plate is formed at the bottom plate of the rear enclosure, the cutout portion and the stand hole can be molded only by the male and female molds that are used to mold the rear enclosure. Still furthermore, different from the related art, since the sliding mold does not to be incorporated into the male and female molds, the mold structure becomes simpler, and thus the cost for mold can be reduced.

Still furthermore, since the coupling structure between the exterior casing of the liquid crystal panel and the stand is reinforced by the reinforcing plate, the liquid crystal panel-attached front enclosure can be made to stand alone more stably.

Still furthermore, since the screws are tightened or loosened through the screw inserting holes of the bosses without separating the rear enclosure from the front enclosure, the stand and the liquid crystal panel can be coupled or uncoupled easily and swiftly.

The configuration of (2) corresponds to the second embodiment (see FIGS. 7-9). According to the configuration of (2), almost the same advantages as those of the configuration of (1) can be obtained, and particularly, the screw holes of the reinforcing plate can be placed concentrically on the pair of through holes (upper and lower) drilled on the connecting rods of the stand only by engaging the engaging pieces of the reinforcing plate with the upper end of the stand, and the reinforcing plate can be coupled simply with the stand only by tightening the screws into the screw holes of the reinforcing plate through the lower through holes of the connecting rods. In addition, the screw holes of the exterior casing can be placed concentrically on the upper through holes of the connecting rods and the screw holes of the reinforcing plate only by making the lower end edge portions of the exterior casing of the liquid crystal panel contact with the receiving plate and the front surface of the reinforcing plate, and the liquid crystal panel-attached front enclosure can be coupled simply and securely with the stand only by tightening the screws into the screw holes of the exterior casing through the upper through holes of the connecting rods and the screw holes of the reinforcing plate.

The configuration of (3) corresponds to a basic embodiment. The liquid crystal panel-attached front enclosure stands alone by the stand and the liquid crystal panel-attached front enclosure, different from the related art, does not need to be leaned against the supporting ballets or the like when repaired or inspected. Accordingly, the liquid crystal display can be repaired or inspected swiftly and easily. In addition, since the liquid crystal panel-attached front enclosure stands alone at the stock yard when stocked, the required area becomes narrower than that of the related art, whereby the cost can be reduced.

Furthermore, since the cutout portion reaching the stand hole from the edge of the bottom plate is formed at the bottom plate of the rear enclosure, the cutout portion and the stand hole can be molded only by the male and female molds that are used to mold the rear enclosure. Still furthermore, different from the related art, since the sliding mold does not to be incorporated into the male and female molds, the mold structure becomes simpler, whereby the cost for mold can be reduced.

According to the configuration of (4), since the coupling structure between the exterior casing of the liquid crystal panel and the stand is reinforced by the reinforcing plate, the liquid crystal panel-attached front enclosure can be made to stand alone more stably.

According to the configuration of (5), since the screws are tightened or loosened through the screw inserting holes of the bosses without separating the rear enclosure from the front enclosure, the stand and the liquid crystal panel can be coupled or uncoupled easily and swiftly.

According to the configuration of (6), the screw holes of the reinforcing plate can be placed concentrically on the pair of through holes (upper and lower) drilled on the connecting rods of the stand only by engaging the engaging-pieces of the reinforcing plate with the upper end of the stand, and the reinforcing plate can be coupled with the stand simply only by tightening the screws into the screw holes of the reinforcing plate through the lower through holes of the connecting rods.

According to the configuration of (7), the screw holes of the exterior casing can be placed concentrically on the upper through holes of the connecting rods and the screw holes of the reinforcing plate only by making the lower end edge portions of the exterior casing of the liquid crystal panel contact with the receiving plate and the front surface of the reinforcing plate, and the liquid crystal panel-attached front enclosure can be coupled with the stand simply and securely only by tightening the screws into the screw holes of the exterior casing through the upper through holes of the connecting rods and the screw holes of the reinforcing plate.

Although the present invention has been shown and described with reference to the embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A liquid crystal display comprising:
    a liquid crystal panel;
    a front enclosure provided with the liquid crystal panel;
    a rear enclosure detachably attached to the front enclosure;
    a stand pivotably supported by a base and attached to the liquid crystal panel; and
    a reinforcing plate sandwiched between the stand and the liquid crystal panel, wherein the rear enclosure is detachable from the front enclosure in a state that the stand is attached to the liquid crystal panel;
    wherein the reinforcing plate has an engaging portion which engages with the stand so that lower and upper screw holes of the reinforcing plate are positioned concentric with lower and upper screw holes of the stand;
    wherein the reinforcing plate has a receiving portion which supports a lower face of the liquid crystal panel so that a screw hole of the liquid crystal panel is positioned concentric with the upper screw hole of the reinforcing plate and the upper screw hole of the stand;
    wherein the lower screw hole of the reinforcing plate and the lower screw hole of the stand are fastened with each other by a screw thereby fixing the reinforcing plate to the stand; and
    wherein the screw hole of the liquid crystal panel, the upper screw hole of the reinforcing plate and the upper screw hole of the stand are fastened with each other by a screw thereby fixing the stand to the liquid crystal panel through the reinforcing plate.

2. The liquid crystal display according to claim 1,
    wherein a plurality of bosses is integrally formed in the rear enclosure and horizontally protrudes from the rear enclosure so as to face the screws; and
    wherein a screw inserting hole is formed in each of the bosses, so that each of the bosses is configured to pass the screws therethrough.

3. The liquid crystal display according to claim 1, wherein the engaging portion is integrally formed at a lower portion of the reinforcing plate and has an L-shaped cross section to engage with an upper edge of the stand.

4. The liquid crystal display according to claim 1, wherein the receiving portion is integrally formed at an upper portion of the reinforcing plate and has a horizontally extending portion for supporting a bottom face of the liquid crystal panel and vertically extending portion for supporting a rear face of the liquid crystal panel.

5. The liquid crystal display according to claim 1, wherein the front enclosure and the rear enclosure are comprised of synthetic resin.

6. The liquid crystal display according to claim 1, wherein a cutout portion is formed at a bottom edge of the rear enclosure so that the stand extends through the cutout portion.

7. The liquid crystal display according to claim 6, wherein a sealing plate is formed at a bottom edge of the front enclosure so that the stand is sandwiched between the cutout portion and the sealing plate.

* * * * *